(12) United States Patent
Otake (10) Patent No.: US 7,811,715 B2
(45) Date of Patent: Oct. 12, 2010

(54) ELECTRICALLY CONDUCTIVE POROUS BODY FOR A FUEL CELL, FUEL CELL HAVING SAME, AND METHOD OF MANUFACTURING SAME

(75) Inventor: Yasuki Otake, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 96 days.

(21) Appl. No.: 12/083,243

(22) PCT Filed: Nov. 23, 2006

(86) PCT No.: PCT/IB2006/003323

§ 371 (c)(1),
(2), (4) Date: Apr. 8, 2008

(87) PCT Pub. No.: WO2007/060527

PCT Pub. Date: May 31, 2007

(65) Prior Publication Data

US 2009/0111001 A1    Apr. 30, 2009

(30) Foreign Application Priority Data

Nov. 24, 2005  (JP) .............................. 2005-338181

(51) Int. Cl.
*H01M 8/02* (2006.01)
*H01M 2/02* (2006.01)
*B05D 5/12* (2006.01)

(52) U.S. Cl. ...................... 429/452; 427/115

(58) Field of Classification Search ............ 429/34–39, 429/452; 427/115

See application file for complete search history.

(56) References Cited

U.S. PATENT DOCUMENTS

| | | | |
|---|---|---|---|
| 3,948,684 A * | 4/1976 | Armstrong | 427/115 |
| 4,119,533 A * | 10/1978 | Saitoh et al. | 209/155 |
| 5,266,177 A * | 11/1993 | Watanabe et al. | 204/290.11 |
| 5,350,643 A * | 9/1994 | Imahashi et al. | 429/33 |
| 6,183,898 B1 | 2/2001 | Koschany et al. | |
| 2005/0181264 A1 | 8/2005 | Gu et al. | |

FOREIGN PATENT DOCUMENTS

EP  1 353 391 A1  10/2003

(Continued)

*Primary Examiner*—Jennifer K Michener
*Assistant Examiner*—Carlos Barcena
(74) *Attorney, Agent, or Firm*—Oliff & Berridge, PLC (57) ABSTRACT

An electrically conductive porous body for a fuel cell has a porous metal body and an electrically conductive layer that is disposed on one surface side of the porous metal body and that has gas permeability, wherein at least a part of the one surface side of the porous metal body is buried into one surface side of the electrically conductive layer, and wherein the flatness of the other surface side of the electrically conductive layer, into which the porous metal body is not buried, is higher than the flatness of the one surface side of the porous metal body. Sufficient contact surface area is obtained between the porous metal body and the membrane electrode assembly, without applying pressure to the porous metal body. It is therefore possible to achieve a low contact resistance with the membrane electrode assembly, without causing a change in the internal condition of the porous metal body.

26 Claims, 9 Drawing Sheets

FOREIGN PATENT DOCUMENTS

| | | | |
|---|---|---|---|
| JP | 07220734 A * | 8/1995 |
| JP | 2000-328279 A | 5/1999 |
| JP | A 2000-328279 | 11/2000 |
| JP | A 2004-71456 | 3/2004 |
| JP | 2006-164765 A | 12/2004 |
| JP | A 2006-164765 | 6/2006 |
| WO | WO 03/038924 A2 | 5/2003 |

* cited by examiner

ELECTRICALLY CONDUCTIVE POROUS BODY FOR A FUEL CELL, FUEL CELL HAVING SAME, AND METHOD OF MANUFACTURING SAME

BACKGROUND OF THE INVENTION

1. Field of the Invention

The present invention relates to an electrically conductive porous body for a fuel cell, to a fuel cell having same, and to a method of manufacturing same.

2. Description of Related Art

A fuel cell is an apparatus that obtains electrical energy, generally using hydrogen and oxygen as fuel. Because the fuel cell is superior with regard to the environment and also achieves a high energy efficiency, fuel cell development is being widely pursued as a future energy supply system. Because a solid polymer fuel cell, among the various types of fuel cells, operates at a relatively low temperature, it has particularly good start-up performance. For this reason, research is being actively conducted in a wide range of fields for the purpose of the practical use thereof.

In a solid polymer fuel cell, current collectors are disposed in intimate contact with both surfaces of a membrane electrode assembly (hereinafter sometimes "MEA") that is formed by the joining of a catalyst layer to both surfaces of a solid polymer electrolyte membrane. A porous electrical conductor is often used for these current collectors. In order to increase the electrical generation efficiency of the fuel cell, it is necessary to reduce the contact resistance between the current collectors and the membrane electrode assembly. In Japanese Patent Application Publication No. JP-A-2004-71456, there is a disclosure of art for polishing and grinding the surface of a titanium sintered body used as an a current collector. According to this art, it is possible to improve the contact surface area ratio between the current collector and the membrane electrode assembly.

In the above-noted disclosed art, however, when performing polishing and grinding, there is the possibility that the internal condition of the collector changes. In this case, it becomes difficult to control the quality of the current collector.

SUMMARY OF THE INVENTION

The invention has an object to provide an electrically conductive porous body for a fuel cell capable of reducing the contact resistance with the membrane electrode assembly without changing the internal condition, a fuel cell using same, and a method of manufacturing same.

An electrically conductive porous body for a fuel cell according to the present invention has a porous metal body and an electrically conductive layer that is disposed on one surface of the porous metal body and that has gas permeability, wherein at least a part of the one surface of the porous metal body is buried into one surface side of the electrically conductive layer, and wherein the flatness of the other surface side of the electrically conductive layer, into which the porous metal body is not buried, is higher than the flatness of the one surface side of the porous metal body.

In the electrically conductive porous body for a fuel cell according to the invention, because the flatness of the electrically conductive layer is high, it is possible to obtain a sufficient contact surface area between the conductive porous body for a fuel cell and the membrane electrode assembly, without applying pressure to the porous metal body. As a result, the contact resistance between the electrically conductive porous body for a fuel cell and the membrane electrode assembly is reduced, without a change in the internal condition of the porous metal body. Also, because a part of the porous metal body is buried into the electrically conductive layer, there is a reduction in the contact resistance between the porous metal body and the electrically conductive layer. As a result, there is an improvement in the electrical generation efficiency of a fuel cell using the electrically conductive porous body for a fuel cell according to the present invention.

In general, the cost of manufacturing a porous metal body with a high degree of flatness is extremely high and also it is difficult to control quality. Specifically, in order to improve the flatness of the porous metal body, it is necessary to perform secondary machining, such as polishing or grinding, of the porous metal body, thereby resulting in an increase in the manufacturing cost. Also, when performing secondary machining, there is a possibility that the surface or internal shape of the porous metal body change, and it is difficult to perform quality control. According to the present invention, however, there is no necessity to use a porous metal body with a high flatness. As a result, the production cost is reduced, and quality control is facilitated.

In the above-described constitution, the porous metal body may be buried into the electrically conductive layer to the extent that there is no gap with the electrically conductive layer. In this case, a sufficient contact surface area is obtained between the electrically conductive porous body for a fuel cell and the membrane electrode assembly, without applying pressure to the porous metal body. Also, there is prevention of the attachment of dust and the like contained in gas that flows to the contact point between the porous metal body and the electrically conductive layer. As a result, a low contact resistance between the porous metal body and the electrically conductive layer is maintained.

In the above-described constitution, the flatness of one surface side of the electrically conductive layer may be 10 μm or less. In this case, a sufficient contact surface area is obtained between the electrically conductive porous body for a fuel cell and the membrane electrode assembly. Also, because the surface pressure between the membrane electrode assembly and the electrically conductive layer is substantially uniform, localized concentration of pressure on the membrane electrode assembly is suppressed. As a result, in addition to the prevention of damage to the membrane electrode assembly, the durability of the membrane electrode assembly is improved. Additionally, in the above-noted constitution, the porous metal body may be a foam sintered metal body.

A fuel cell according to the present invention has any one of the electrically conductive porous bodies for a fuel cell described above, and a MEA in which a catalyst layer is formed on both surfaces of an electrolyte membrane, and in which at least one of the catalyst layers and one surface of the electrically conductive porous body for a fuel cell are disposed so as to be in opposition, in other words, a MEA wherein a catalyst layer is formed on each side of an electrolyte membrane and the electrically conductive porous body is provided on or above at least one of the catalyst layers. In the fuel cell according to the present invention, sufficient contact surface area is obtained between the electrically conductive porous body for a fuel cell and the catalyst layer, without applying pressure to the porous metal body. In this case, a low contact resistance is achieved, without a change in the internal condition of the porous metal body. As a result, there is an improvement in the electrical generation efficiency of the fuel cell.

In the above-noted constitution, the electrically conductive layer may have water repellency with respect to the MEA. In this case, water that is produced with generation of electricity at the MEA is ejected to the porous metal body side with high efficiency. As a result, the stagnation of water produced by electrical generation at the MEA is suppressed. In addition, there is suppression of a decrease in the electrical generation efficiency of the fuel cell.

A fuel cell according to the present invention is characterized by having any of the electrically conductive porous body for a fuel cell described above, and a MEA in which a catalyst layer and gas diffusion layer are sequentially formed on both sides of an electrolyte membrane and wherein at least one of the gas diffusion layers and one surface of the electrically conductive porous body for a fuel cell are disposed so as to be in opposition, in other words, a MEA wherein a catalyst layer is formed on each side of an electrolyte membrane and a gas diffusion layer is formed on each of the catalyst layers and the electrically conductive porous body is provided on or above at least one of the gas diffusion layers. According to this constitution, sufficient contact surface area is obtained between the electrically conductive porous body for a fuel cell and the gas diffusion layer, without applying pressure to the porous metal body. In this case, a low contact resistance is achieved without a change in the internal condition of the porous metal body. As a result, there is an improvement in the electrical generation efficiency of the fuel cell.

In the above-noted constitution, the electrically conductive layer may have hydrophilicity with respect to the gas diffusion layer. In this case, reverse flow to the MEA of water that is drained with generation of electricity is suppressed by the gas diffusion layer. As a result, the stagnation of water produced by electrical generation at the MEA is suppressed. Additionally, there is suppression of a decrease in the electrical generation efficiency of the fuel cell.

A method of manufacturing an electrically conductive porous body for a fuel cell according to the present invention is characterized by having disposing of an electrically conductive slurry to a prescribed thickness on a flat plate, laminating an electrically conductive porous body onto the electrically conductive slurry, drying the electrically conductive slurry and forming an electrically conductive layer having gas permeability, and separating the electrically conductive layer and the flat plate.

In the method of manufacturing an electrically conductive porous body for a fuel cell according to the present invention, an electrically conductive slurry is disposed to a prescribed thickness on a flat plate, an electrically conductive porous body is laminated onto the electrically conductive slurry, the electrically conductive slurry is dried and an electrically conductive layer having gas permeability is formed, and the electrically conductive layer and the flat plate are separated. In this case, there is an improvement in the flatness of the electrically conductive layer. Accordingly, it is possible to obtain sufficient contact surface area between the electrically conductive porous body for a fuel cell and the membrane electrode assembly, without applying pressure to the electrically conductive porous body. As a result, there is a reduction in the contact resistance between the electrically conductive porous body for a fuel cell and the membrane electrode assembly, without a change in the internal condition of the electrically conductive porous body. Also, because a part of the electrically conductive porous body is buried into the electrically conductive layer, a low contract resistance is achieved between the electrically conductive porous metal body and the electrically conductive layer. As a result, there is an improvement in the electrical generation efficiency of the fuel cell.

In the above-noted constitution, the flatness of the upper surface of the flat plate may be 10 μm or less. In this case, a sufficient contact surface area is obtained between the electrically conductive porous body for a fuel cell and the electrically conductive layer. Also, because the surface pressure between the membrane-electrode assembly and the electrically conductive layer is substantially uniform, localized concentration of pressure on the membrane electrode assembly is suppressed. As a result, in addition to the prevention of damage to the membrane electrode assembly, there is an improvement in the durability of the membrane electrode assembly. In the above-noted constitution, the electrically conductive porous body may be a porous metal body, and the metal porous body may be a foam sintered metal body.

A method of manufacturing a fuel cell according to the present invention is characterized by manufacturing an electrically conductive porous body for a fuel cell by any one of the above-described methods of manufacturing, and laminating the electrically conductive porous body onto an MEA, in which a catalyst layer is formed on both surfaces of a proton-conductive electrolyte membrane, an electrically conductive layer and at least one of the catalyst layer so that they are opposing, in other words, laminating the electrically conductive porous body onto an MEA wherein a catalyst layer is formed on each side of a proton-conductive electrolyte membrane, so that the electrically conductive layer is provided on or above at least one of the catalyst layers. In this method of manufacturing, the electrically conductive porous body for a fuel cell is laminated onto the MEA wherein a catalyst layer is formed on both surfaces of a proton-conductive electrolyte membrane, so that the electrically conductive layer is provided on or above at least one catalyst layer. In this case, sufficient contact surface area is obtained between the electrically conductive porous body for a fuel cell and the catalyst layer, without applying pressure to the electrically conductive porous body. As a result, the contact resistance is reduced, without a change in the internal condition of the electrically conductive porous body. Additionally, there is an improvement in the electrical generation efficiency of the fuel cell.

In the above-noted constitution, the electrically conductive layer may have water repellency with respect to the MEA. In this case, water that is produced with generation of electricity at the MEA is ejected to the porous metal body side with high efficiency. As a result, the stagnation of water produced by electrical generation at the MEA is suppressed. In addition, a decrease in the electrical generation efficiency of the fuel cell is suppressed.

Another method of manufacturing a fuel cell according to the invention is characterized by manufacturing an electrically conductive porous body for a fuel cell by any one of the above-described methods of manufacturing, and laminating onto an MEA, in which a catalyst layer and a gas diffusion layer are sequentially formed on both surfaces of a proton-conductive electrolyte membrane, at least one of the electrically conductive layers and gas diffusion layers so as to be in opposition, in other words, laminating the electrically conductive porous body onto an MEA wherein a catalyst layer is formed on each side of a proton-conductive electrolyte membrane and a gas diffusion layer is formed on each of the catalyst layers, so that at least one of the electrically conductive layers is provided on or above the gas diffusion layer. In this method of manufacturing a fuel cell according to the invention, the electrically conductive porous body for a fuel cell is laminated onto the MEA wherein a catalyst layer is formed on each side of a proton-conductive electrolyte membrane and a gas diffusion layer is formed on each side of a proton-conductive electrolyte membrane, so that at least one of the electrically conductive layer is provided on or above the gas diffusion layers. In this case, sufficient contact surface area is obtained between the electrically conductive porous body for a fuel cell and the gas diffusion layer, without applying pressure to the electrically conductive porous body. As a result, the contact resistance is reduced, without a change in the internal condition of the electrically conductive porous body. Additionally, the electrical generation efficient of the fuel cell is improved.

In the above-noted constitution, the electrically conductive layer may have hydrophilicity with respect to the gas diffusion later. In this case, reverse flow to the MEA of water that is ejected with generation of electricity is suppressed by the gas diffusion layer. As a result, stagnation of electrical generation product water in the MEA is suppressed. Additionally, a decrease in the electrical generation efficiency of the fuel cell is suppressed.

According to the present invention, it is possible to reduce the contact resistance with the membrane electrode assembly without causing a change in the internal condition.

BRIEF DESCRIPTIONS OF THE DRAWINGS

The foregoing and/or further objects, features, and advantages of the present invention will become more apparent from the following description of preferred embodiments, with reference to the accompanying drawings, in which like numerals are used to represent like elements, and wherein.

DETAILED DESCRIPTION OF THE PREFERRED EMBODIMENTS

In the following description, the present invention will be described in more detail in terms of exemplary embodiments.

Figure 1:
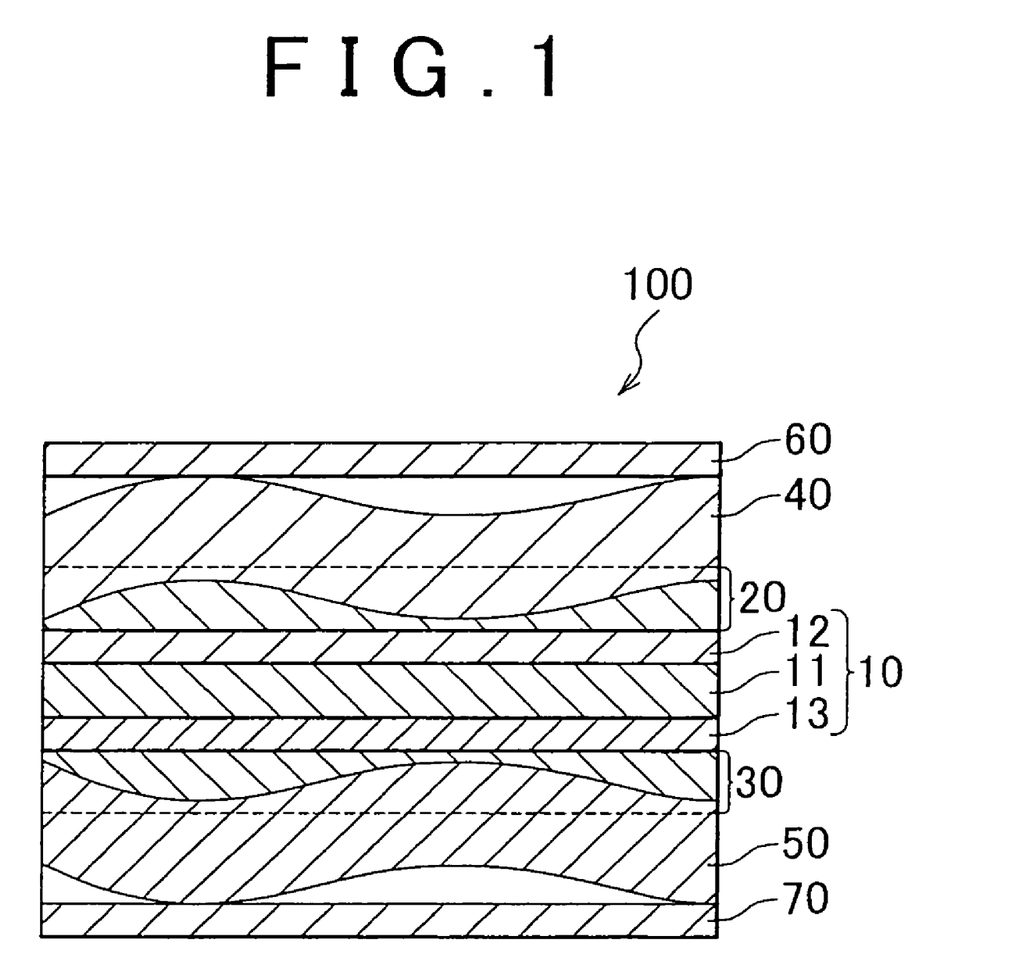
FIG. 1 is a schematic cross-sectional view of a fuel cell according to a first embodiment of the present invention.

FIG. 1 is a schematic cross-sectional view of a fuel cell 100 according to the first embodiment of the present invention. As shown in FIG. 1, the fuel cell 100 includes a membrane electrode assembly (MEA) 10, water-repellent layers 20, 30, porous body layers 40, 50, and separators 60, 70. The MEA 10 is formed by an electrolyte layer 11 and by catalyst layers 12, 13. The electrolyte layer 11 is made of, for example, a solid polymer having proton conductivity. The catalyst layers 12, 13 are made of, for example, carbon that carries platinum. The platinum contained in the catalyst layers 12, 13 is used as a catalyst for the purpose of converting hydrogen to protons and for the purpose of reacting protons with oxygen. The catalyst layers 12, 13 are formed on each side of the electrolyte layer 11.

The water-repellent layers 20, 30 are made of a material such as PTFE (polytetrafluoroethylene), carbon, or the like, which has water repellency, electrical conductivity, and gas permeability. In order to improve the water repellency, the electrical conductivity, and the gas permeability of the water-repellent layers 20, 30, it is preferable that carbon nanotubes be used for the water-repellent layers 20, 30. In this case, providing water repellency means having a contact angle of 90° or greater. The membrane thickness of the water-repellent layers 20, 30 is, for example, approximately 50 μm. The water-repellent layers 20, 30 are formed on each of the catalyst layer 12, 13. The surfaces of the water-repellent layers 20, 30 on the MEA 10 side have a flatness that is higher than the flatness of the porous body layers 40, 50. The flatnesses of the surfaces of the water-repellent layers 20, 30 on the MEA 10 side are each, for example, 10 μm or less.

The porous body layers 40, 50 are made of electrically conductive bodies of foam sintered metal bodies or the like. The porous body layers 40, 50 function as gas flow passages for the flow of gas and as gas diffusion layers for the supply of gas to the catalyst layers. In this embodiment, titanium foam sintered metal bodies are used as the porous body layers 40, 50. For example, the membrane thickness of the porous body layers 40, 50 is approximately 0.5 mm, the average pore diameter of the porous body layers 40, 50 is approximately 0.05 mm to 1 mm, the average pore diameter between particles is approximately 0.1 μm to 40 μm, and the pore ratio is approximately 40% to 99%. The porous body layers 40, 50 can be fabricated by the doctor blade method or the like. The porous body layers 40, 50 are formed on each of the water-repellent layer 20, 30.

A part of the lower surface side of the porous body layer 40 is buried and fixed into the water-repellent layer 20. It is preferable that a part of the lower surface side of the porous body layer 40 be buried into the water-repellent layer 20 to the extent that there is no gap between the lower surface of the porous body layer 40 and the upper surface of the water-repellent layer 20. A part of the upper surface side of the porous body layer 50 is buried and fixed into the water-repellent layer 30. It is preferable that a part of the upper surface side of the porous body layer 50 be buried into the water-repellent layer 30 to the extent that there is no gap between the upper surface of the porous body layer 50 and the lower surface of the water-repellent layer 30.

The separators 60, 70 are made from an electrically conductive material such as stainless steel or the like. The separators 60, 70 are formed on each of the porous body layer 40, 50. The membrane thickness of the separators 60, 70 is, for example, approximately 0.3 mm. Although to simplify the description a single cell is shown in FIG. 1, in an actual fuel cell, a plurality of these single cells are laminated.

The operation of the fuel cell 100 will be described. First, a fuel gas containing hydrogen is supplied to the porous body layer 50. The fuel gas flows through the inside of the porous body layer 50, permeates through the water-repellent layer 30, and reaches the catalyst layer 13. Hydrogen contained in the fuel gas that reaches the catalyst layer 13 is separated into protons and electrons. The protons are conducted through the electrolyte layer 11 and reach the catalyst layer 12.

Oxidant gas that contains oxygen is supplied to the porous body layer 40. The oxidant gas flows through the inside of the porous body layer 40, permeates through the water-repellent layer 20, and reaches the catalyst layer 12. Water is produced and electricity is generated from the oxygen contained in the oxidant gas that reaches the catalyst layer 12 and protons. The electrical power that is generated is recovered by the separators 60, 70. By these operations the fuel cell 100 generates electricity.

Electrical generation product water that is produced accompanying the generation of electricity permeates through the water-repellent layer 20 and reaches the porous body layer 40. Because the water-repellent layer 20 has water repellency, the electrical generation water is drained to the porous body layer 40 side with good efficiency. As a result, stagnation of the electrical generation product water at the catalyst layer 12 is suppressed. In the same manner, water on the water-repellent layer 30 side is drained with good efficiency. As a result, it is possible to suppress a reduction in the electrical generation efficiency of the fuel cell 100. Electrical generation product water that has reached the porous body layer 40 flows in the flow direction of the oxidant gas because of the flow pressure of the oxidant gas. By virtue of the above, electrical generation product water is efficiently drained in the fuel cell 100.

In the fuel cell 100 according to this embodiment, because the flatness of the surfaces of the water-repellent layers 20, 30 on the MEA 10 side is high, the contact surface area between the water-repellent layers 20, 30 and the MEA 10 increases. Because of this, the contact resistance between the water-repellent layers 20, 30 and the MEA 10 is reduced. As a result, the electrical generation efficiency of the fuel cell 100 is improved. Also, because the surface pressure between the water-repellent layers 20, 30 and the MEA 10 is substantially uniform, local concentration of pressure on the MEA 10 is prevented. As a result, damage to the MEA 10 is prevented and the durability of the MEA 10 is improved.

In the porous body layers 40, 50, there is often surface unevenness caused by the method of manufacturing the porous body layers 40, 50. Because the porous body layer 40 is buried into the water-repellent layer 20, it is possible to obtain sufficient contact surface area between the porous body layer 40 and the water-repellent layer 20, without applying pressure to the porous body layer 40. In particular, if there is no gap between the porous body layer 40 and the water-repellent layer 20, the contact surface area is further increased. As a result, the contact resistance between the porous body layer 40 and the water-repellent layer 20 is reduced. The same applies between the porous body layer 50 and the water-repellent layer 30. As a result, the electrical generation efficiency of the fuel cell 100 is improved.

If sufficient surface contact area is obtained between the porous body layer 40 and the water-repellent layer 20, it becomes easy for heat generated accompanying electrical generation to reach the porous body layer 40. The same applies between the porous body layer 50 and the water-repellent layer 30. Because of this, it is possible to cool the fuel cell 100 with good efficiency. Additionally, because the porous body layer 40 is buried into the water-repellent layer 20 beforehand, the attachment of dust and the like that is included in the fuel gas or in the oxidant gas to the contact point between the porous body layer 40 and the water-repellent layer 20 is prevented. As a result, a low contact resistance is maintained between the porous body layer 40 and the water-repellent layer 20. The same applies between the porous body layer 50 and the water-repellent layer 30.

Because it is not necessary to apply pressure to the porous body layers 40, 50, which have uneven surfaces, the application of locally concentrated pressure to the MEA 10 is prevented. As a result, damage to the MEA 10 is prevented, and the durability of the MEA 10 is improved. Also, because it is not necessary to apply pressure to the porous body layers 40, 50, it is possible to suppress deformation of the porous body layers 40, 50. As a result, it is possible to suppress a decrease in the gas permeability and water draining performance of the porous body layers 40, 50.

In this case, in general the cost of manufacturing a porous body layer with a high degree of flatness is extremely high, and it is difficult to control quality. This is because, in order to improve the flatness of the porous body layer, it is necessary to perform secondary machining, such as polishing or grinding, of the porous body layer. Also, when performing secondary machining, there is a possibility that the surface or internal shape of the porous body layer changes. According to the constitution of this embodiment, however, even if a porous body layer with high flatness is not used, sufficient contact surface area is obtained between the porous body layer and the MEA, and also there is no change in the internal condition of the porous body layer. As a result, the production cost is reduced, and quality control is facilitated.

Figure 2A:
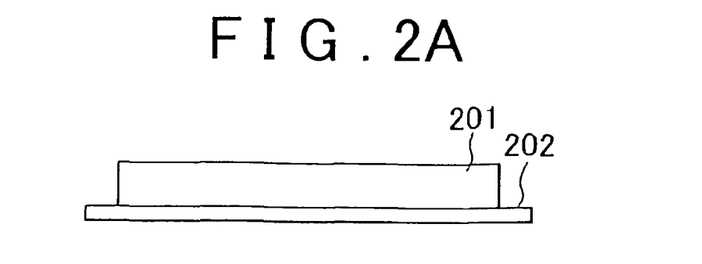
FIG. 2A to FIG. 2G are manufacturing flow diagrams for describing a method of manufacturing a fuel cell according to the first embodiment of the present invention.

A method of manufacturing the fuel cell 100 will be described. FIG. 2A to FIG. 2G are manufacturing flow diagrams for describing the method of manufacturing the fuel cell 100. First, as shown in FIG. 2A, a water repellent 201 in the form of a slurry is applied onto a die 202. A slurry-like PTFE or carbon or the like may be used as the water repellent 201. It is preferable to use a die 202 having good die removability and a flatness of approximately 10 μm. For example, it is possible to use PTFE.

Figure 2B:
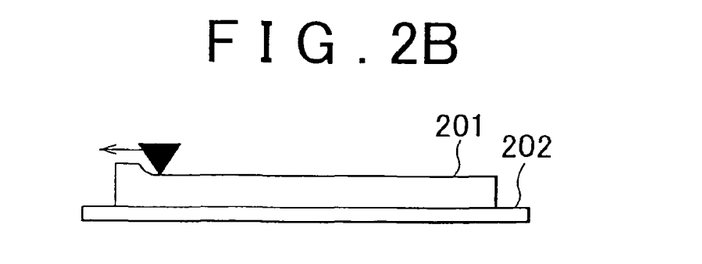

Next, as shown in FIG. 2B, screening or the like is used to adjust the membrane thickness of the water repellent 201. Furthermore, in the case of using a material having a low volatility as the water repellent 201, it is possible to adjust the membrane thickness of the water repellent over a period of time. Therefore, even if the membrane thickness is not adjusted by screening or the like, it is possible to adjust thickness of the membrane of the water repellent by pouring a prescribed amount of water repellent into a die of a prescribed volume.

Figure 2C:
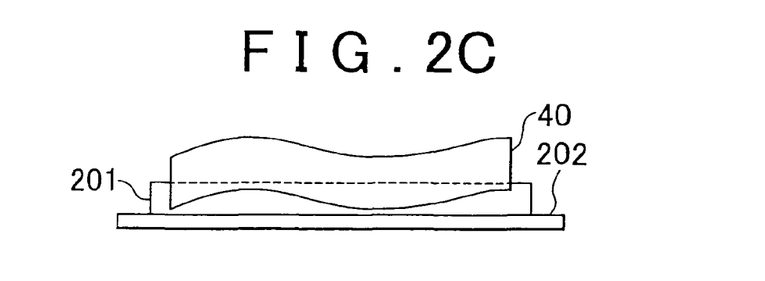

Next, as shown in FIG. 2C, the porous body layer 40 is disposed on the water repellent 201 so that a part of the lower surface side of the porous body layer 40 is immersed into the water repellent 201. In this case, it is preferable that the porous body layer 40 be pushed against the water repellent 201 so that no gap exists between the lower surface of the porous body layer 40 and the upper surface of the water repellent 201. Furthermore, because the porous body layer 40 is made of metal, it is more difficult to deform than the slurry-like water repellent 201. For this reason, even in the case of pressing the porous body layer 40 against the water repellent 201, it is not necessary to make an adjustment so that the viscosity of the slurry-like water repellent 201 becomes low.

Figure 2D:
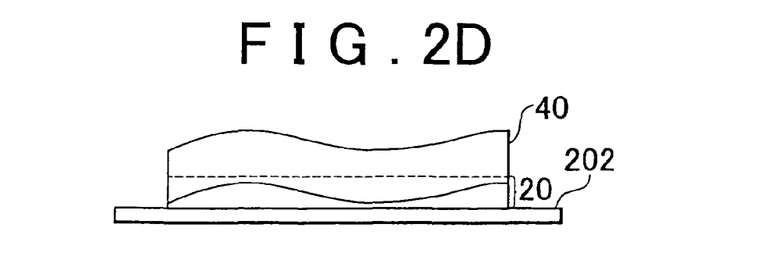
Figure 2E:
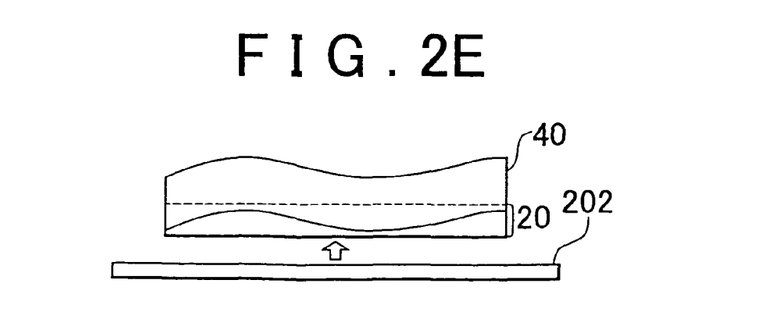

Next, as shown in FIG. 2D, the water repellent 201 is dried and the unneeded part of the water repellent 201 is cut away. The dried water repellent 201 corresponds to the water-repellent layer 20 of FIG. 1. Next, as shown in FIG. 2E, the water repellent 201 and the porous body layer 40 are removed from the die. The water-repellent layer 30 and the porous body layer 50 can be fabricated by the same method as shown in FIG. 2A to FIG. 2E.

Figure 2F:
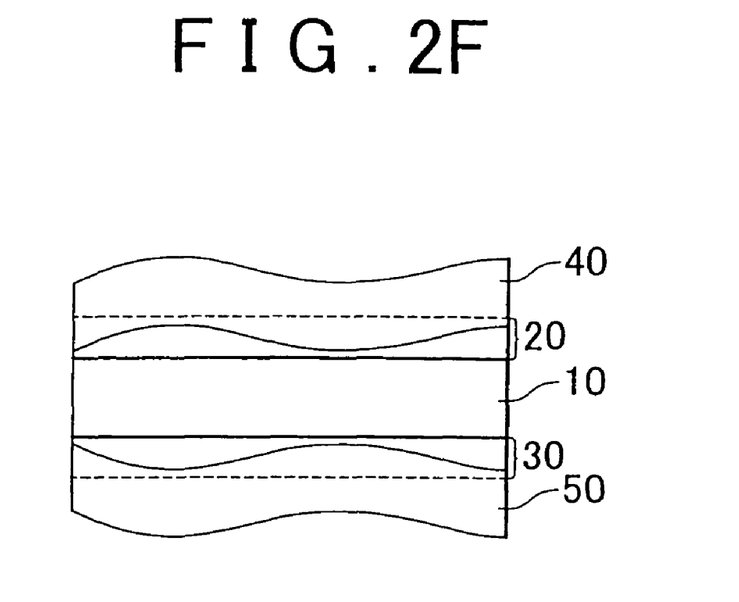
Figure 2G:
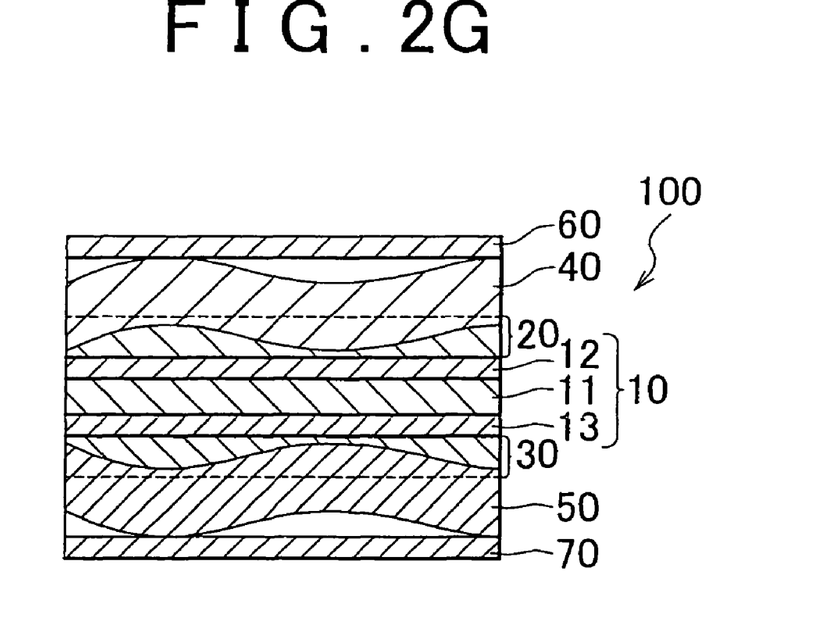

Next, as shown in FIG. 2F, the water-repellent layers 20, 30 are disposed on each side of the MEA 10, and the porous body layers 40, 50 are disposed on each of the water-repellent layers 20, 30. Next, as shown in FIG. 2G, the separator 60, 70 are disposed on each of the porous body layer 40, 50. The above process steps complete the fuel cell 100.

According to the method of manufacturing shown in FIG. 2A to FIG. 2G, because the porous body layer 40 is immersed in the water repellent 201, sufficient contact surface area is obtained between the porous body layer 40 and the dried water-repellent layer 20, without applying pressure to the porous body layer 40. In particular, if there is no gap between the porous body layer 40 and the water repellent 201, a further increased contact surface area is achieved. Because of this, the contact resistance between the porous body layer 40 and the water-repellent layer 20 is kept low. In the same manner, the contact resistance between the porous body layer 50 and the water-repellent layer 30 is kept low.

Because sufficient contact surface area is obtained between the porous body layer 40 and the water-repellent layer 20, there is no need to apply pressure to the porous body layer 40 for the purpose of reducing the contact resistance. This applies to the porous body layer 50 as well. As a result, the application of locally concentrated pressure to the MEA 10 is prevented. Additionally, damage to the MEA 10 is prevented, and the durability of the MEA 10 is improved. It is additionally possible to suppress deformation of the porous body layers 40, 50. By suppressing deformation of the porous body layers 40, 50, it is possible to suppress a decrease in the gas permeability and water draining performance of the porous body layers 40, 50. It is also possible to achieve the effect of the present invention without using a porous body layer with a high flatness. As a result, it is possible to reduce the production cost and facilitate quality control.

If the flatness of the water-repellent layers 20, 30 on the MEA 10 side is improved, the contact resistance between the water-repellent layers 20, 30 and the MEA 10 is decreased. The surface pressure between the water-repellent layers 20, 30 and the MEA 10 is substantially uniform. As a result, the application of locally concentrated pressure to the MEA 10 is prevented. Additionally, damage to the MEA 10 is prevented, and the durability of the MEA 10 is improved.

Although the above embodiment uses a titanium foam sintered metal body as the porous body layers 40, 50, there is no restriction in this regard. For example, it is possible to use a metal sintered body such as stainless steel or nickel and the like, which has good corrosion resistance. It is also possible to use a metal foam body in which a metal carbide is uniformly dispersed. For example, it is possible to use a metal foam body in which a Cr carbide or a FeCr carbide or the like is uniformly dispersed in stainless steel.

In this embodiment, the porous body layers 40, 50 correspond to the electrically conductive porous body layer and porous metal body, the water-repellent layers 20, 30 correspond to the electrically conductive layer, the porous body layer 40 and water-repellent layer 20 or the porous body layer 50 and water-repellent layer 30 correspond to the electrically conductive porous body for a fuel cell, the water repellent 201 corresponds to the electrically conductive slurry, and the die 202 corresponds to the flat plate.

Figure 3:
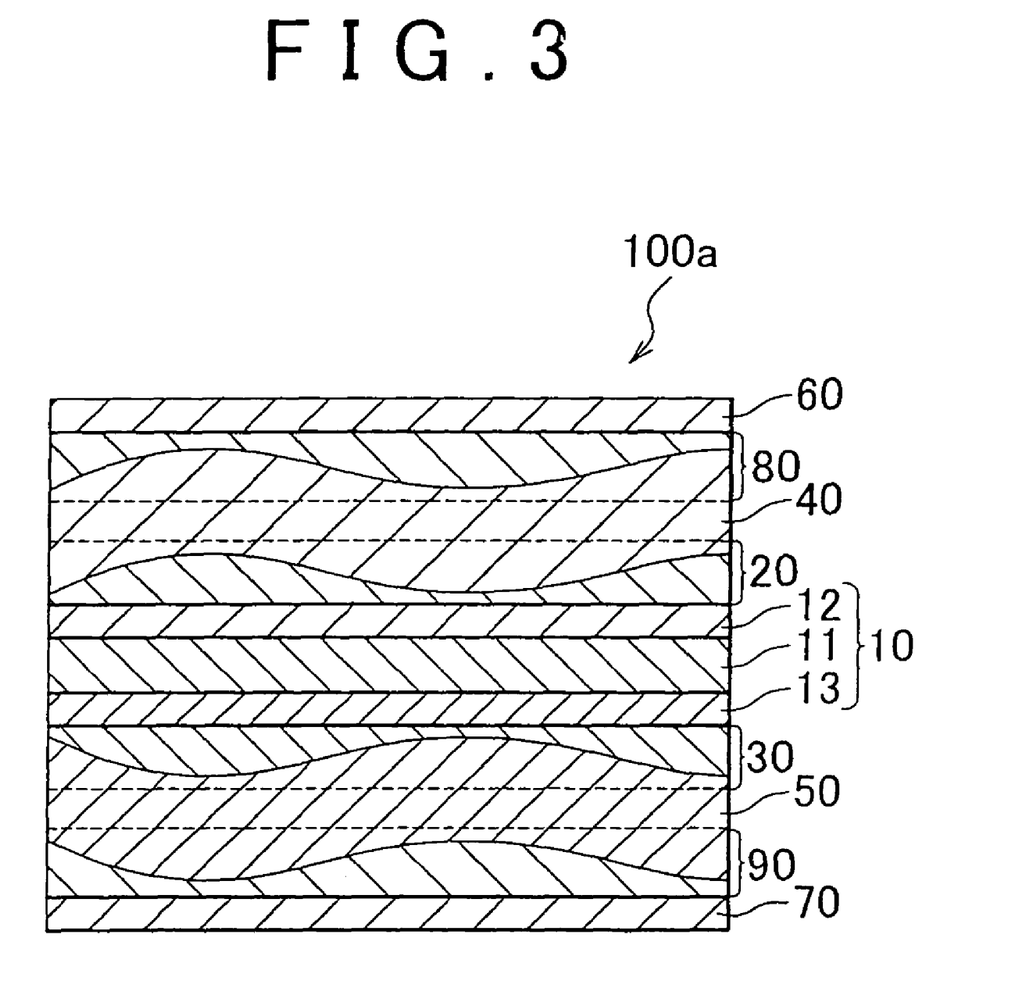
FIG. 3 is a schematic cross-sectional view of a fuel cell according to a second embodiment of the present invention.

The fuel cell 100a according to the second embodiment of the present invention will now be described. FIG. 3 is a schematic cross-sectional view of the fuel cell 100a. As shown in FIG. 3, the fuel cell 100a differs from the fuel cell 100 of the first embodiment in that a hydrophilic layer 80 is formed on the separator 60 side of the porous body layer 40 and in that a hydrophilic layer 90 is formed on the separator 70 side of the porous body layer 50. Other constituent elements of the fuel cell 100a are the same as the fuel cell 100. Locations that are the same as the first embodiment have been marked with the same reference numerals and are not described herein.

The hydrophilic layers 80, 90 are made of a hydrophilic material wherein silica or titania or the like is mixed with PTFE, and have electrical conductivity and gas diffusibility. In this case, having hydrophilicity means having a contact angle of less than 90°. The membrane thickness of the hydrophilic layers 80, 90 is, for example, approximately 50 μm. The surface of the hydrophilic layer 80 on the separator 60 side and the surface of the hydrophilic layer 90 on the separator 70 side are formed so as to have a flatness of 10 μm or less. A part of the upper surface side of the porous body layer 40 is buried and fixed in the hydrophilic layer 80, and it is preferable that a part of the upper surface side of the porous body layer 40 is buried and fixed in the hydrophilic layer 80 so that there is no gap between the upper surface of the porous body layer 40 and the hydrophilic layer 80. In the same manner a part of the lower surface side of the porous body layer 50 is buried in the hydrophilic layer 90.

In the fuel cell 100a according to this embodiment, a large contact surface area is obtained between the hydrophilic layer 80 and the separator 60, and between the hydrophilic layer 90 and the separator 70. As a result, a high electrical generation efficiency is achieved in the fuel cell 100a. The larger the contact surface area is, the easier it is for heat generated accompanying the electrical generation reaction at the MEA 10 to transfer to the separators 60, 70. As a result, it is possible to cool the fuel cell 100a with improved efficiency.

In this embodiment, because the porous body layer 40 is buried in the hydrophilic layer 80 beforehand, the attachment of dust and the like that is included in the fuel gas and in the oxidant gas to the contact point between the porous body layer 40 and the hydrophilic layer 80 is prevented. Accordingly, a low contact resistance is maintained between the porous body layer 40 and the hydrophilic layer 80. The same applies between the porous body layer 50 and the hydrophilic layer 90. Also, because of the hydrophilicity of the hydrophilic layer 80, it is possible for electrical generation product water that has permeated through the water-repellent layer 20 to be drained with good efficiency to the separator 60 side. In the same manner, the water at the water-repellent layer 30 side is drained with good efficiency by the hydrophilic layer 90.

Figure 4A:
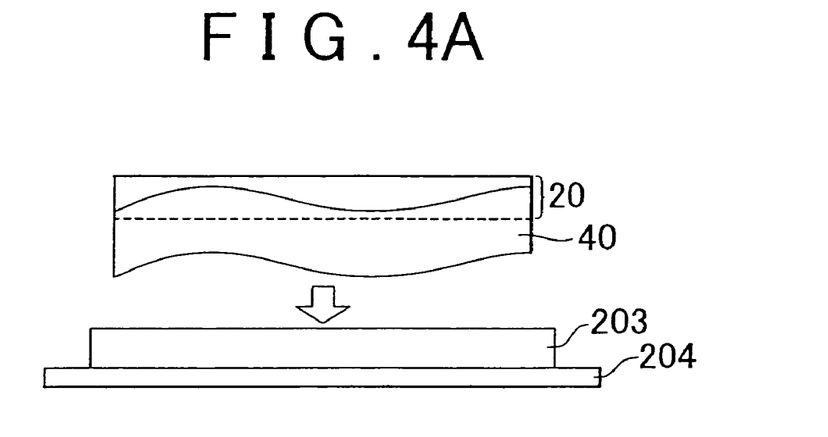
FIG. 4A to FIG. 4E are manufacturing flow diagrams for describing a method of manufacturing a fuel cell according to the second embodiment of the present invention.

FIG. 4A to FIG. 4E are manufacturing flow diagrams for describing a method of manufacturing the fuel cell 100a. First, as shown in FIG. 4A, a slurry-like hydrophilic substance 203 adjusted to a prescribed thickness on a die 204, and a water-repellent layer 20 and porous body layer 40 fabricated as in FIG. 2E are prepared. The die 204 preferably has a flatness that is the same as that of the die 202 of FIG. 2. It is possible to use PTFE, SBR (styrenebutadiene rubber), or carbon or the like that contains a slurry-like silica or titania or the like as the hydrophilic substance 203.

Figure 4B:
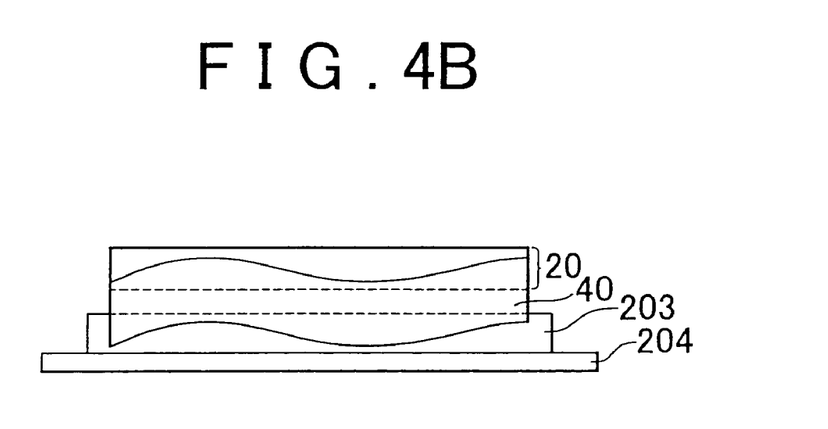
Figure 4C:
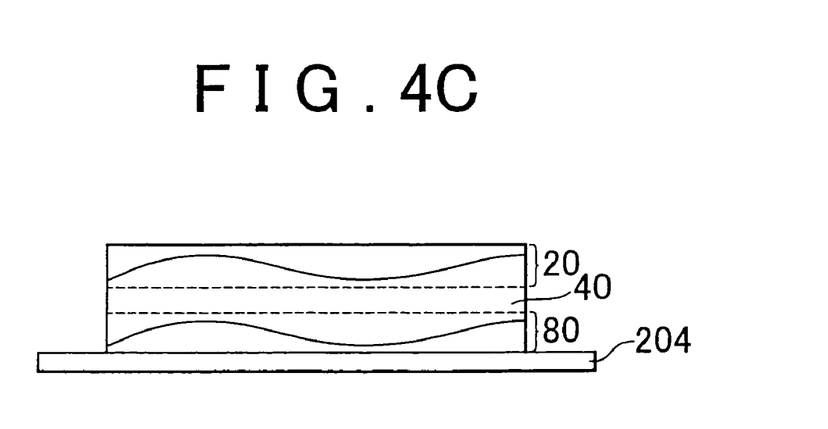

Next, as shown in FIG. 4B, the porous body layer 40 is disposed on the hydrophilic substance 203 so that a part of the porous body layer 40 on the side opposite from the water-repellent layer 20 is immersed in the hydrophilic substance 203. In this case, it is preferable that the porous body layer 40 be pressed against the hydrophilic substance 203 so that there is no gap between the porous body layer 40 and the hydrophilic substance 203. Next, as shown in FIG. 4C, the hydrophilic substance 203 is dried and the unneeded part of the hydrophilic substance is cut away. The dried hydrophilic substance 203 corresponds to the hydrophilic layer 80 of FIG. 3. The hydrophilic layer 90 and the porous body layer 50 can be fabricated by the same method as shown in FIG. 4A to FIG. 4C.

Figure 4D:
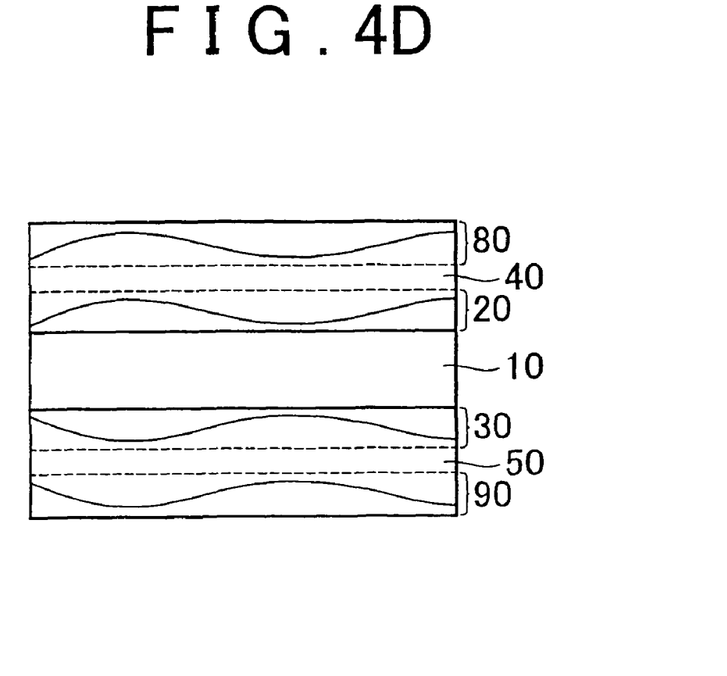
Figure 4E:
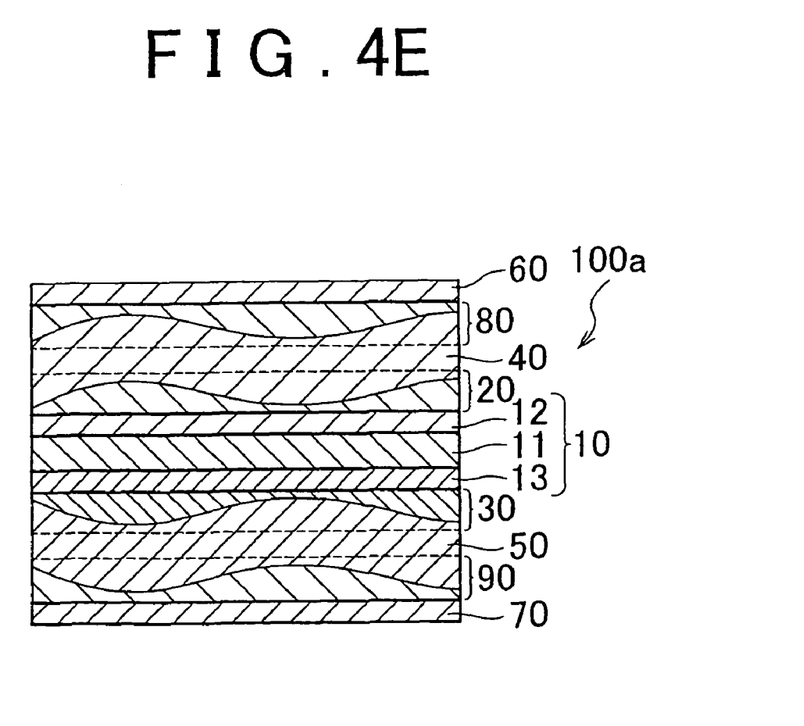

Next, as shown in FIG. 4D, the water-repellent layers 20, 30 are disposed on each side of the MEA 10, the porous body layers 40, 50 are disposed on each of the water-repellent layers 20, 30, and the hydrophilic layers 80, 90 are disposed on each of the hydrophilic layers 80, 90. Next, as shown in FIG. 4E, the separators 60, 70 are disposed on each of the hydrophilic layers 80, 90. The above process steps complete the fuel cell 100a.

According to the method of manufacturing of FIG. 4A to FIG. 4E, because the porous body layer 40 is immersed in the hydrophilic substance 203, a sufficient surface contact area is obtained between the porous body layer 40 and the dried hydrophilic layer 80, without applying pressure to the porous body layer 40. In particular, if there is no gap between the porous body layer 40 and the hydrophilic layer 80, the contact surface area is further increased. As a result, the contact resistance between the porous body layer 40 and the hydrophilic layer 80 is reduced. In the same manner, the contact resistance between the porous body layer 50 and the hydrophilic layer 90 is reduced.

In this embodiment, the porous body layer 40, the water-repellent layer 20 and the hydrophilic layer 80 or the porous body layer 50, the water-repellent layer 30 and the hydrophilic layer 90 correspond to the electrically conductive porous body for a fuel cell, the hydrophilic layers 80, 90 correspond to the electrically conductive layers, the hydrophilic substance 203 corresponds to electrically conductive slurry, and the die 204 corresponds to the flat plate.

Figure 5:
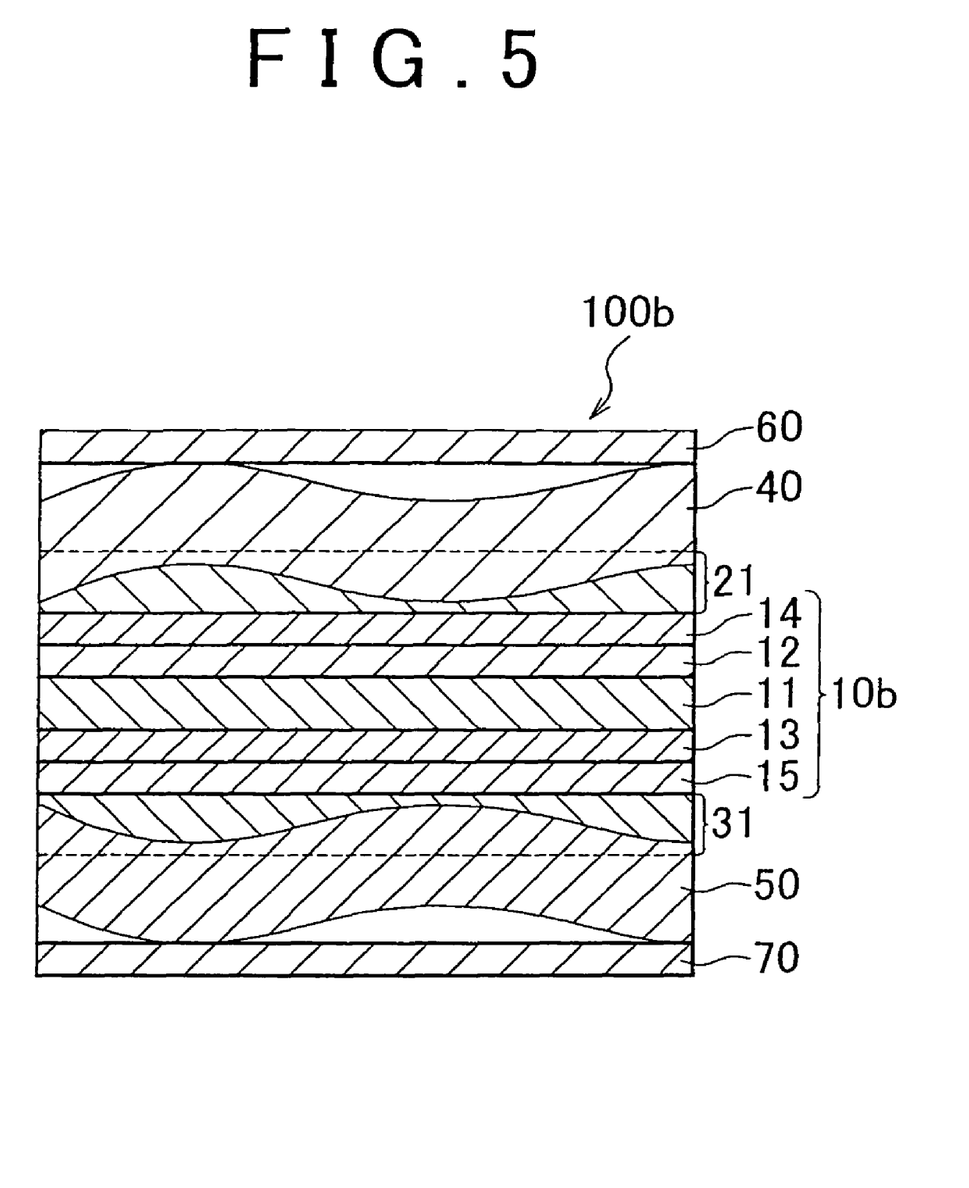
FIG. 5 is a schematic cross-sectional view of a fuel cell according to a third embodiment of the present invention.

A fuel cell 100b according to the third embodiment of the present invention will now be described. FIG. 5 is a schematic cross-sectional view of the fuel cell 100b. As shown in FIG. 5, the fuel cell 100b differs from the fuel cell 100 of the first embodiment in that the MEA 10b is provided in place of the MEA 10, in that the hydrophilic layer 21 is provided in place of the water-repellent layer 20, and in that the hydrophilic layer 31 is provided in place of the water-repellent layer 30. The MEA 10b differs from the MEA 10 in that a gas diffusion layers 14, 15 are provided on each of the catalyst layer 12, 13. Other constituent elements of the fuel cell 100b are the same as those of the fuel cell 100. Locations that are the same as the first embodiment have been marked with the same reference numerals and are not described herein.

The gas diffusion layers 14, 15 are made, for example, of carbon paper or carbon cloth or the like that contains a carbon fiber or PTFE, and have water repellency, electrical conductivity, and gas diffusibility. The membrane thickness of the gas diffusion layers 14, 15 is, for example, approximately 150 μm. The hydrophilic layers 21 and 31 are made from a hydrophilic material wherein silica or titania or the like is mixed with PTFE, and have electrical conductivity and gas diffusibility. The membrane thickness of the hydrophilic layers 21, 31 is, for example, approximately 50 μm.

A part of the lower surface side of the porous body layer 40 is buried and fixed into the hydrophilic layer 21. It is preferable that the part of the lower surface side of the porous body layer 40 be buried in the hydrophilic layer 21 to the extent that there is no gap between the lower surface of the porous body layer 40 and the upper surface of the hydrophilic layer 21. A part of the upper surface side of the porous body layer 50 is buried and fixed into the hydrophilic layer 31. It is preferable that the part of the upper surface side of the porous body layer 50 be buried in the hydrophilic layer 31 to the extent that there is no gap between the upper surface of the porous body layer 50 and the lower surface of the hydrophilic layer 31. The hydrophilic layers 21, 31 can be fabricated by the same forming method as the hydrophilic layers 20, 30 shown in FIG. 2.

In this embodiment, because the gas diffusion layer 14 has water repellency and the hydrophilic layer 21 has hydrophilicity, the electrical generation product water is drained to the hydrophilic layer 21 side with good efficiency. As a result, stagnation of electrical generation product water in the catalyst layer 12 is suppressed. In the same manner, water at the gas diffusion layer 15 side is drawing to the hydrophilic layer 31 with good efficiency. As a result, it is possible to suppress a decrease in the electrical generation efficiency of the fuel cell 100b.

Figure 6A:
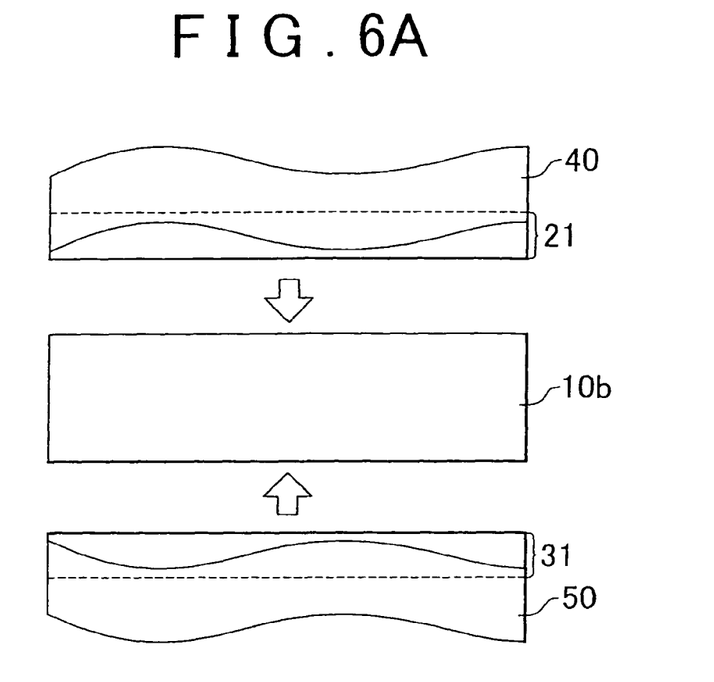
FIG. 6A and FIG. 6B are manufacturing flow diagrams for describing the method of manufacturing a fuel cell according to the third embodiment of the present invention.
Figure 6B:
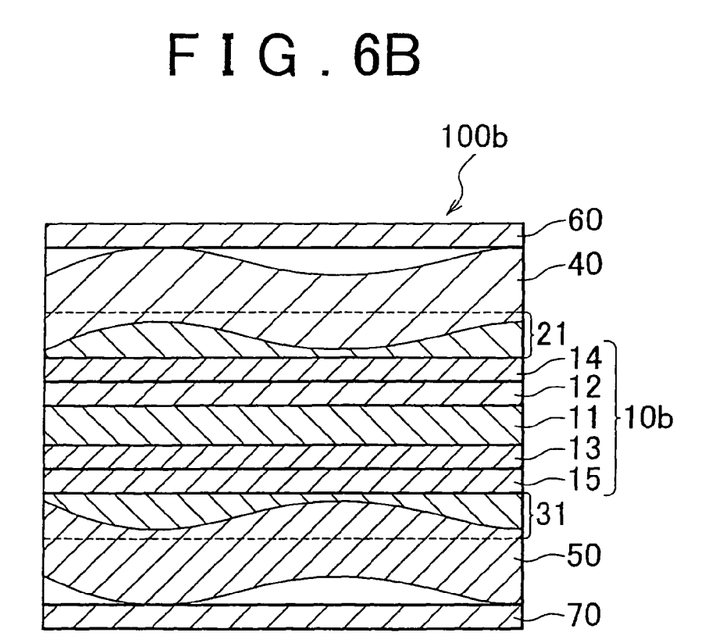

FIG. 6A and FIG. 6B are manufacturing flow diagrams for describing the method of manufacturing the fuel cell 100b. As shown in FIG. 6A, the hydrophilic layer 21 and porous body layer 40, the hydrophilic layer 31 and the porous body layer 50, and the MEA 10b are disposed so that the hydrophilic layers 21, 31 are formed on each side of the MEA 10b. Next, as shown in FIG. 6B, the separators 60, 70 are disposed on each of the porous body layer 40, 50. The above process steps complete the fuel cell 10b.

Figure 7:
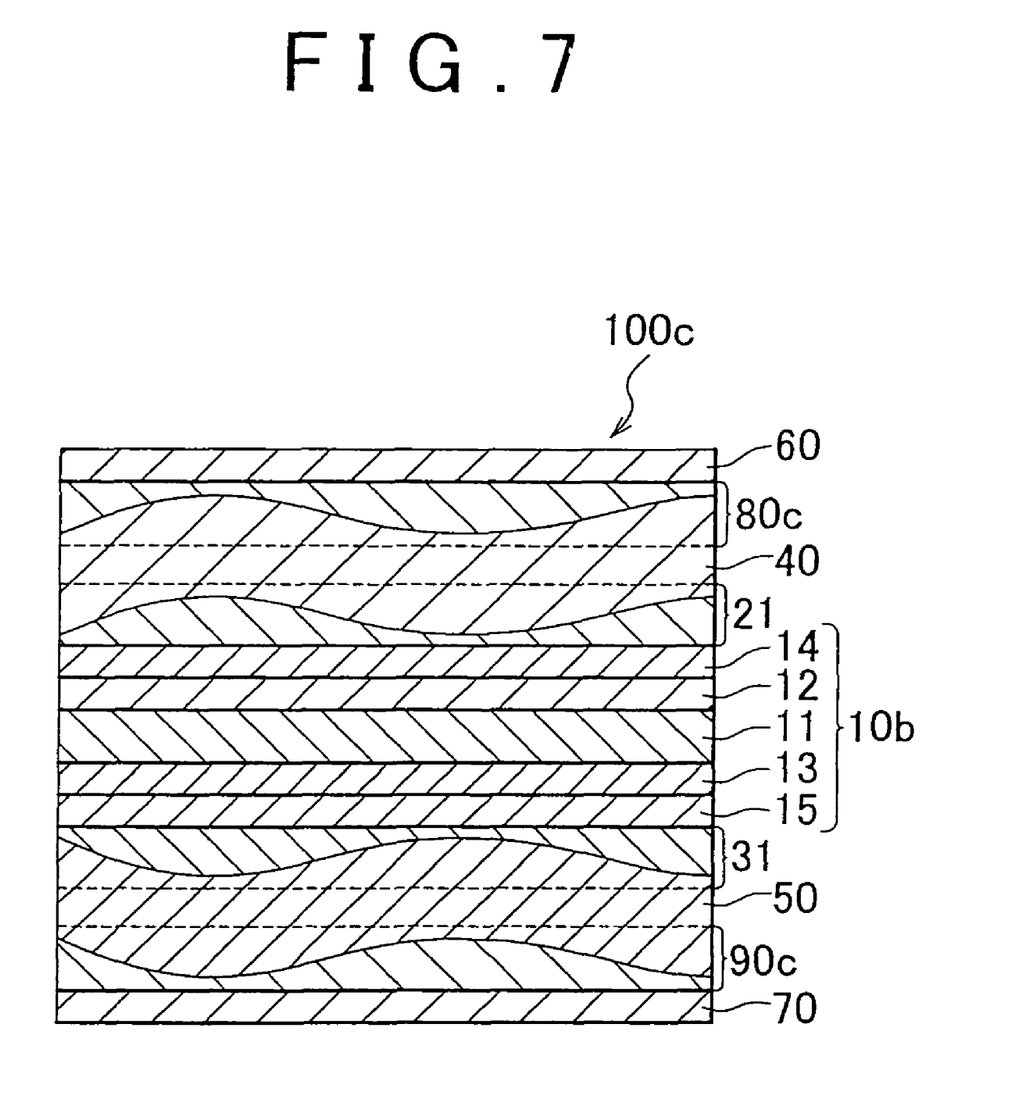
FIG. 7 is a schematic cross-sectional view of a fuel cell according to a fourth embodiment of the present invention.

Next, the fuel cell 100c according to the fourth embodiment of the present invention will be described. FIG. 7 is a schematic cross-sectional view of the fuel cell 100c. The fuel cell 100c differs from the fuel cell 100b according to the third embodiment in FIG. 5 in that a hydrophilic layer 80c is formed on the separator 60 side of the porous body layer 40, and in that the hydrophilic layer 90c is formed on the separator 70 side of the porous body layer 50. Other constituent elements of the fuel cell 100c are the same as the fuel cell 100b. Locations that are the same as the third embodiment have been marked with the same reference numerals and are not described herein.

The hydrophilic layers 80c, 90c are made from a hydrophilic substance wherein silica or titania or the like is mixed with SBR, and have electrical conductivity and gas diffusibility. The hydrophilicity of the hydrophilic layer 80c is set so as to be greater than the hydrophilicity of the hydrophilic layer 21, and the hydrophilicity of the hydrophilic layer 90c is set so as to be greater than the hydrophilicity of the hydrophilic layer 31.

In this embodiment, because the gas diffusion layer 14 has water repellency and the hydrophilic layer 21 has hydrophilicity, electrical generation product water is drained to the hydrophilic layer 21 side with good efficiency. Additionally, because the hydrophilic layer 80c has a hydrophilicity that is greater than that of the hydrophilic layer 21, water from the hydrophilic layer 21 is pulled into the hydrophilic layer 80c. As a result, stagnation of electrical generation product water in the MEA 10b is suppressed. Also, a decrease in the electrical generation efficiency of the fuel cell 100c is suppressed. At the gas diffusion layer 15 side as well, water is drained with good efficiency by the hydrophilic layer 31 and the hydrophilic layer 90c.

Both the porous body layer 40, hydrophilic layer 21, and hydrophilic layer 80c, and the porous body layer 50, hydrophilic layer 31, and hydrophilic layer 90c correspond to the electrically conductive porous body for a fuel cell.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less, or only a single element, are also within the spirit and scope of the invention.

The invention claimed is:

1. An electrically conductive porous body for a fuel cell, comprising:
   a porous metal body; and
   an electrically conductive layer that is disposed on one surface side of the porous metal body in direct contact with the porous metal body and that has water repellency and gas permeability, wherein at least a part of the one surface of the porous metal body is buried into one surface side of the electrically conductive layer, and the flatness of the other surface side of the electrically conductive layer, into which the porous metal body is not buried, is higher than the flatness of the one surface side of the porous metal body.

2. An electrically conductive porous body for a fuel cell according to claim 1, wherein the porous metal body is buried into the electrically conductive layer to the extent that there is no gap with the electrically conductive layer.

3. An electrically conductive porous body for a fuel cell according to claim 1, wherein a flatness of the one surface side of the electrically conductive layer is 10 μm or less.

4. An electrically conductive porous body for a fuel cell according to claim 1, wherein the porous metal body is a foam sintered metal body.

5. A fuel cell comprising:

an electrically conductive porous body for a fuel cell according to claim 1, and an MEA in which a catalyst layer is formed on both surfaces of an electrolyte membrane, and in which at least one of the catalyst layers and one surface of the electrically conductive porous body for a fuel cell are disposed so as to be in opposition.

6. A fuel cell comprising:

an electrically conductive porous body for a fuel cell according to claim 1, and an MEA wherein a catalyst layer is formed on each side of an electrolyte membrane and the electrically conductive porous body is provided on or above at least one of the catalyst layers.

7. A fuel cell comprising:

an electrically conductive porous body for a fuel cell according to claim 1; and a MEA wherein a catalyst layer and gas diffusion layer are sequentially formed on both sides of an electrolyte membrane and wherein at least one of the gas diffusion layers and one surface side of the electrically conductive porous body for a fuel cell are disposed so as to be in opposition.

8. A fuel cell comprising:

an electrically conductive porous body for a fuel cell according to claim 1; and a MEA wherein a catalyst layer is formed on each side of an electrolyte membrane and a gas diffusion layer is formed on each of the catalyst layers and the electrically conductive porous body is provided on or above at least one of the gas diffusion layers.

9. A method of manufacturing an electrically conductive porous body for a fuel cell, comprising:

disposing an electrically conductive slurry to a prescribed thickness on a flat plate;

laminating an electrically conductive porous body directly onto the electrically conductive slurry;

drying the electrically conductive slurry and forming an electrically conductive layer having water repellency and gas permeability; and separating the electrically conductive layer and the flat plate.

10. A method of manufacturing an electrically conductive porous body for a fuel cell according to claim 9, wherein the flatness of an upper surface of the flat plate is 10 μm or less.

11. A method of manufacturing an electrically conductive porous body for a fuel cell according to claim 9, wherein the electrically conductive porous body is a porous metal body.

12. A method of manufacturing an electrically conductive porous body for a fuel cell according to claim 9, wherein the porous metal body is a foam sintered metal body.

13. A method of manufacturing a fuel cell, comprising:

manufacturing an electrically conductive porous body for a fuel cell by a method of manufacturing according to claim 9; and laminating the electrically conductive porous body onto an MEA, in which a catalyst layer is formed on both surfaces of a proton-conductive electrolyte membrane, the electrically conductive layer and at least one of the catalyst layers so as to be in opposition.

14. A method of manufacturing a fuel cell, comprising:

manufacturing an electrically conductive porous body for a fuel cell by a method of manufacturing according to claim 9; and laminating the electrically conductive porous body onto an MEA wherein a catalyst layer is formed on each side of a proton-conductive electrolyte membrane, so that the electrically conductive layer is provided on or above at least one of the catalyst layers.

15. A method of manufacturing a fuel cell, comprising:

manufacturing an electrically conductive porous body for a fuel cell by a manufacturing method according to claim 9;

laminating the electrically conductive porous body onto an MEA, in which a catalyst layer and a gas diffusion layer are sequentially formed on both side of a proton-conductive electrolyte membrane, so that at least one of the electrically conductive layers and the gas diffusion layer are in opposition.

16. A method of manufacturing a fuel cell, comprising:

manufacturing an electrically conductive porous body for a fuel cell by a manufacturing method according to claim 9;

laminating the electrically conductive porous body onto an MEA wherein a catalyst layer is formed on each side of a proton-conductive electrolyte membrane and a gas diffusion layer is formed on each of the catalyst layers, so that at least one of the electrically conductive layers is provided on or above the gas diffusion layer.

17. An electrically conductive porous body for a fuel cell, comprising:

a porous metal body; and an electrically conductive layer that is disposed on one surface side of the porous metal body in direct contact with the porous metal body and that has hydrophilicity and gas permeability, wherein at least a part of the one surface of the porous metal body is buried into one surface side of the electrically conductive layer, and the flatness of the other surface side of the electrically conductive layer, into which the porous metal body is not buried, is higher than the flatness of the one surface side of the porous metal body.

18. A fuel cell comprising:

an electrically conductive porous body for a fuel cell according to claim 17, and an MEA in which a catalyst layer is formed on both surfaces of an electrolyte membrane, and in which at least one of the catalyst layers and one surface of the electrically conductive porous body for a fuel cell are disposed so as to be in opposition.

19. A fuel cell comprising:
an electrically conductive porous body for a fuel cell according to claim 17, and an MEA wherein a catalyst layer is formed on each side of an electrolyte membrane and the electrically conductive porous body is provided on or above at least one of the catalyst layers.

20. A fuel cell comprising:
an electrically conductive porous body for a fuel cell according to claim 17; and
a MEA wherein a catalyst layer and gas diffusion layer are sequentially formed on both sides of an electrolyte membrane and wherein at least one of the gas diffusion layers and one surface side of the electrically conductive porous body for a fuel cell are disposed so as to be in opposition.

21. A fuel cell comprising:
an electrically conductive porous body for a fuel cell according to claim 17; and
a MEA wherein a catalyst layer is formed on each side of an electrolyte membrane and a gas diffusion layer is formed on each of the catalyst layers and the electrically conductive porous body is provided on or above at least one of the gas diffusion layers.

22. A method of manufacturing an electrically conductive porous body for a fuel cell, comprising:
disposing an electrically conductive slurry to a prescribed thickness on a flat plate;
laminating an electrically conductive porous body directly onto the electrically conductive slurry;
drying the electrically conductive slurry and forming an electrically conductive layer having hydrophilicity and gas permeability; and
separating the electrically conductive layer and the flat plate.

23. A method of manufacturing a fuel cell, comprising:
manufacturing an electrically conductive porous body for a fuel cell by a method of manufacturing according to claim 22; and
laminating the electrically conductive porous body onto an MEA, in which a catalyst layer is formed on both surfaces of a proton-conductive electrolyte membrane, the electrically conductive layer and at least one of the catalyst layers so as to be in opposition.

24. A method of manufacturing a fuel cell, comprising:
manufacturing an electrically conductive porous body for a fuel cell by a method of manufacturing according to claim 22; and
laminating the electrically conductive porous body onto an MEA wherein a catalyst layer is formed on each side of a proton-conductive electrolyte membrane, so that the electrically conductive layer is provided on or above at least one of the catalyst layers.

25. A method of manufacturing a fuel cell, comprising:
manufacturing an electrically conductive porous body for a fuel cell by a manufacturing method according to claim 22:
laminating the electrically conductive porous body onto an MEA, in which a catalyst layer and a gas diffusion layer are sequentially formed on both side of a proton-conductive electrolyte membrane, so that at least one of the electrically conductive layers and the gas diffusion layer are in opposition.

26. A method of manufacturing a fuel cell, comprising:
manufacturing an electrically conductive porous body for a fuel cell by a manufacturing method according to claim 22:
laminating the electrically conductive porous body onto an MEA wherein a catalyst layer is formed on each side of a proton-conductive electrolyte membrane and a gas diffusion layer is formed on each of the catalyst layers, so that at least one of the electrically conductive layers is provided on or above the gas diffusion layer.

* * * * *